3,479,213
MIXED SOLVENT SOLUTION OF POLYMER FOR PAPER TREATMENT
Keiichi Takeda, Tokyo, Japan, assignor, by mesne assignments, to Momotoshi Watanabe, Tokyo, Japan
No Drawing. Filed Dec. 16, 1965, Ser. No. 514,390
Claims priority, application Japan, Dec. 29, 1964, 39/74,228
Int. Cl. C08f 33/02; D21h 3/40, 3/80
U.S. Cl. 117—155    5 Claims

ABSTRACT OF THE DISCLOSURE

The method for waterproofing and adhesion strengthening comprising: coating a paper or cardboard with a composition comprising a synthetic resin dissolved in a solvent, said solvent consisting of xylene and one of the following, methylene chloride, methyl ethyl ketone and perchloroethylene, the proportion of xylene to the other being 5 to 1–2.

---

This invention relates to a novel plastic solution for moisture resistance water proofing and adhesion strengthening and more particularly it pertains to a thermoplastic resin solution.

Hitherto, it has been well known that starting materials for plastics, particularly thermoplastic resins such as vinyl chloride, cellulose acetate, polystyrenes, methacrylates, polyethylene, "Teflon" (trademark for polytetrafluoroethylene resin), polyamide and the like, for example styrene monomer are usually subjected to an emulsion polymerization to form a synthetic latex, or those resins are dissolved in a suitable solvent to form a solvent type coating material which would be used for miscellaneous purposes, for example, water proofing and adhesion strengthening in the working of papers, adhesion of shaped materials, lacquer finishing and the like.

When applied to the working of paper, adhesion, coating and the like, however, the known latex and solvent type coating materials, for example, such as polystyrene latex and coating material are likely to develop small fissures with the lapse of time and therefore become ineffective, as usually observed and experienced.

To obviate the above disadvantages, the inventor has carried out many studies from the various aspects and found that the suitability of the solvent to the plastics plays the most important part.

As solvents for the plastics, especially for the thermoplastic resins there may be mentioned quick drying solvents, intermediate drying solvents and slow drying solvents. Hitherto these solvents have been usually used independently or in the form of mixture thereof. Aforementioned disadvantages have resulted from the unsuitability of the solvents.

The inventor has prepared and tested various kinds of mixed solvents by taking into consideration the proportion of the miscellaneous solvents. It has been found that the solvent consisting essentially of intermediate drying solvent xylene and quick drying methylene chloride or methyl ethyl ketone, or intermediate drying perchloroethylene is the most suitable for plastic.

According to the present invention, it is essential to adequately select the proportion of the other solvents to xylene. The recommended proportion of xylene to other solvents is 5 to 1–2.

When the plastic solution prepared by using a solvent in the aforesaid proportion is used in the working of paper, for example, strengthening of corrugated boards, adhesion or coating of plastics, no fissures are observed on the strengthened, adhered or coated surfaces and the surfaces hold their favorable effects for an extended period of time.

The plastic solution for moisture resistance water proofing and adhesion strengthening of the present invention may be mixed with a suitable plasticizer according to its use.

Further, it will be appreciated that a plasticizer, produced by adding an emulsifier consisting essentially of a nonionic surface active agent to a paraffine either in a liquid or solid form, heating and then cooling the mixture slowly, is eminently suitable for the polystyrene solvent solution.

The exemplified proportion of the components of the fundamental plastic solution for moisture resistance water proofing and adhesion strengthening contemplated by the invention will be shown in the following:

(1)

| | Kg. |
|---|---|
| Xylene [1] | 5 |
| Methylene chloride [1] | 1 |
| Plasticizer [1] | 0.03 |
| Polystyrene | 1 |

(2)

| | |
|---|---|
| Xylene [1] | 8 |
| Perchloroethylene [1] | 3 |
| Polystyrene | 1 |

[1] Solvent.

The above fundamental plastic solutions are preferable to the use after dilution with additional solvent, according to the use.

The fundamental plastic solutions thus produced are considerably effective when used for the working of papers, the strengthening of corrugated board, the adhesion of plastic products as well as water proofing and strengthening of fibrous products. The fundamental plastic solution may also be colored by adding certain dyestuffs.

To strengthen the corrugated board, for example, by using the fundamental plastic solutions of the invention, it is preferred to use the above mentioned fundamental plastic solution (1) which is added a plasticizer in order to increase the impact, breaking, compressive and bending strengths. For strengthening the corrugated board, 7 kg. of the fundamental plastic solution (1) for example, is mixed with 8 kg. of the solvent and the corrugated board is immersed in this mixture for fifty seconds and then dried for twenty four hours to provide the toughened corrugated board.

As the result of the various tests carried out on corrugated board treated with the plastic solution of the present invention, it has been ascertained that the said strengthened corrugated board is less expensive and has more excellent properties than the conventional ones.

The breaking and impact strengths of two corrugated boards comprising an outside liner (C in 230 g.), a core (metasemichemical pulp in 150 g.) and a rear side liner (C in 200 g.) one of which was strengthened with the present plastic solution and the other not treated, and the compressive strength of two boxes in the dimension of 585 x 290 x 273 mm. one of which was manufactured by the strengthened corrugated board and the other by the commercial corrugated board are respectively shown in the following table.

| Number of samples | Strengthened | | | Not strengthened | | |
|---|---|---|---|---|---|---|
| | 1 | 2 | 3 | 1 | 2 | 3 |
| Subjects: | | | | | | |
| Breaking strength (kg./cm.²): | | | | | | |
| Maximum | 14.4 | 14.1 | 14.4 | 10.4 | 10.8 | 11.0 |
| Minimum | 12.6 | 12.6 | 12.5 | 8.0 | 8.2 | 8.1 |
| Average | 13.4 | 13.3 | 13.2 | 9.38 | 9.17 | 9.38 |
| Total average | | 13.3 | | | 9.31 | |
| Impact strength (kg./cm.²): | | | | | | |
| Maximum | 73.0 | 74.0 | 74.0 | 54.0 | 58.0 | 54.0 |
| Minimum | 65.0 | 67.0 | 66.0 | 47.0 | 48.0 | 48.0 |
| Average | 69.4 | 69.4 | 70.1 | 51.2 | 54.8 | 51.9 |
| Total average | | 69.6 | | | 52.6 | |
| Compressive strength: | | | | | | |
| Compressive load (kg.) | 480 | 540 | 480 | 270 | 300 | 270 |
| Compression amount (mm.) | 16 | 14 | 15 | 14 | 18 | 16 |
| Average compressive load (kg.) | | 500 | | | 247 | |
| Average of compression amount (mm.) | | 15 | | | 16 | |

Remarks:
(1) Applied quantity: g. per m.² _____ 60
(2) Water content:
  Strengthened one _____percent__ 10
  Not strengthened one _____percent__ 1.5

Moreover, no arsenic substance, lead and formaldehyde was detected by tests carried out on the solution leached with 2 ml. of 4% acetic acid per 1 cm.² of the surface area of the strengthened corrugated boards in accordance with the hygienic method agreed by Japan Pharmaceutical Association.

I claim:
1. A method for waterproofing and strengthening comprising: coating a paper or cardboard with a composition comprising polystyrene dissolved in a solvent, said solvent consisting of xylene and one of the following: methylene chloride, methyl ethyl ketone and perchloroethylene, the proportion of xylene to the other being 5 to 1-2.
2. The method for waterproofing and strengthening as claimed in claim 1, wherein said composition is 8 kg. of xylene, 3 kg. of perchloroethylene and 1 kg. of polystyrene.
3. The method for waterproofing and adhesion strengthening as claimed in claim 1, in which a suitable plasticizer is incorporated in said composition.
4. The method for waterproofing and adhesion strengthening as claimed in claim 1, wherein said composition is 5 kg. of xylene, 1 kg. of methylene chloride, 0.03 kg. of plasticizer, and 1 kg. of polystyrene.
5. The method for waterproofing and adhesion strengthening as claimed in claim 1, in which the plastic solution is mixed with dyestuffs.

References Cited
UNITED STATES PATENTS
2,207,623 7/1940 Kauppi et al.
2,348,447 5/1944 Brock.
2,397,093 3/1946 Dreyfus et al.
3,046,245 7/1962 Kern et al.

OTHER REFERENCES
Boundy et al.: Styrene, Its Polymers, Copolymers and Derivatives, Reinhold Pub. Corp., New York, 1952, pages 426 and 427, TP 986 S7 B6 C.5.

Worth, Albin H.: The Chemistry and Technology of Waxes, Reinhold Pub. Corp., New York, 1956, pp. 539, 540, TP 670 W25 1956 C.5.

MORRIS LIEBMAN, Primary Examiner
J. H. DERRINGTON, Assistant Examiner

U.S. Cl. X.R.
260—32.8, 33.6, 33.8